United States Patent Office 3,216,965
Patented Nov. 9, 1965

3,216,965
BLEND OF A POLYTEREPHTHALAMIDE AND A LOWER MELTING POLYAMIDE FOR IMPROVED DYE RECEPTIVITY
Cipriano Cipriani, Hopewell, Va., assignor to Celanese Corporation of America, New York, N.Y., a corporation of Delaware
No Drawing. Filed Mar. 29, 1962, Ser. No. 183,365
17 Claims. (Cl. 260—37)

This application is a continuation-in-part of application Serial No. 83,981 filed January 23, 1961.

This invention relates to the production of shaped articles, e.g., filaments of improved dyeability.

There has been proposed in applicant's Serial No. 83,981, filed January 23, 1961, the entire disclosure of which is incorporated by reference, a method for the formation of shaped articles of condensation polymers containing repeating =NRCO= groups, where R is hydrogen or a monovalent organic radical such as lower alkyl, utilizing a solution of the polymer in concentrated sulfuric acid. This process is particularly satisfactory for the production of shaped articles of the "difficultly meltable" polymers, i.e., the polymers which cannot be easily shaped using melt extrusion techniques because they tend to seriously degrade and/or further polymerize to a useless infusible mass, when heated to a temperature sufficient to melt them. While filaments and other shaped articles of difficultly meltable polymers so produced are useful as such in a wide variety of applications, there exist uses, e.g., the manufacture of certain types of textiles, for which improved dye-receptivity is desirable. Although it may be possible to improve the dye-receptivity of such shaped articles by various treatments, e.g., the use of special dyeing conditions and equipment, any method of producing the shaped article which eliminates or minimizes these special expedients and which allows for satisfactory dyeing which can be achieved with commercially available standard dyeing equipment, is particularly desirable.

It is an object of this invention to provide a process for the formation of shaped articles such as filaments of difficultly meltable polymers containing recurring structural units of the formula —NRCO— where R is hydrogen or a monovalent organic radical such as lower alkyl, said shaped articles having improved dye-receptivity. It is a further object of this invention to provide a process for the production of filaments of the foregoing difficultly meltable polymers whereby the necessity for extensive after treatment or the use of special dyeing conditions and equipment is substantially eliminated or minimized.

In accordance with one aspect of the invention, a shaped article is formed by extruding through an orifice having at least one thin dimension a solution of a polymer mixture comprising a major amount of a difficultly meltable condensation polymer containing recurring amide groups as an integral part of the polymer chain, and a minor amount of an easily meltable polyamide. By "easily meltable" polyamide is meant that class of polyamides which are known in the art to be easily melt extruded to form shaped articles without excessive degradation and sacrifice of the properties of the polymer.

The difficultly meltable polymers contemplated under this invention include, for example, high melting polymers, e.g., polyamides proper melting above 275° C. and in general polymers having cyclic groups, e.g., meta- or para-phenylene, cycloalkylene groups such as 1,4-cyclohexylene and/or heterocyclic groups such as piperazylene or an alkyl substituted piperazylene group, e.g., 2-lower alkyl piperazylene such as 2-methyl piperazylene or 2,5-di-lower alkyl piperazylenes such as 2,5-dimethyl piperazylene, as an integral part of the polymer chain.

Some contemplated difficultly meltable polyamides are those, for example, which have repeating structural units of the formula —NR—Y—NR'—CO—Y'—CO— which result from the condensation of a dicarboxylic acid or a derivative thereof, e.g., a salt, acylhalide, or ester of such an acid, with a diamine, wherein the R's, which may be the same or different, are hydrogen or monovalent organic radicals, e.g., lower alkyl such as methyl or ethyl, and the Y's, which also may be the same or different, are divalent organic radicals such as alkylene, e.g., ethylene, tetramethylene or hexamethylene, arylene such as para- or meta-phenylene, para-, or meta-xylylene, or para- or meta-diethylene benzene, cycloalkylene such as 1,4-cyclohexylene, or divalent heterocyclic radicals such as those derived from piperazine, and alkyl and di-alkyl piperazines, e.g., 2-methyl- and 2,5-dimethyl piperazines and 2-ethyl and 2,5-diethyl piperazines, wherein the open bonds are attached to the nitrogen atoms, and wherein the chemical structure of the polymer and/or the polymerization technique used is such that a relatively high melting polymer is obtained.

An important group of polyamides within the above group are those in which Y and/or Y' is or contains a para- or meta-phenylene radical or a 1,4-cyclohexylene radical, and particularly important are condensation products of a diamine and terephthalic acid or a derivative of terephthalic acid, e.g., terephthaloyl chloride or a dialkyl terephthalate. Some specific polymers within this latter group are poly(polymethylene)terephthalamides wherein the polymethylene groups contain 2 to 10 carbon atoms, e.g., polyhexamethylene terephthalamide, polyoctamethylene terephthalamide, polytetramethylene terephthalamide, polyethylene terephthalamide and polypiperazylene terephthalamide. Other polyterephthalamides are poly-o-, m-, and p-phenylene terephthalamides, poly-o-, m-, and p-xylylene terephthalamides and poly-o-, m- and p-diethylene-phenylene terephthalamides, the latter produced, for example, by condensing an ester-forming derivative of terephthalic acid with para-bis (betaaminoethyl) benzene. The polyterephthalamides when shaped in accordance with the invention exhibit a particularly good combination of properties, e.g., mechanical properties such as tenacity and elongation, water insensitivity as indicated by high wet stiffness and low shrinkage, and particularly high sensitivity to disperse and acid dyes.

Also contemplated as difficultly meltable polymers are high melting autocondensation polymers, e.g. melting above 275° C., of an aminocarboxylic acid or a lactam or other derivatives of such an acid, which polymers have repeating structural units of the formula

—NR—Y—CO— wherein R and Y are as defined above. Some specific polyamides melting above 275° C. within this group are polymers of the following: 1-carboxymethyl-4-aminocyclohexane or its lactam, 1-carboxy-4-aminocyclohexane or its lactam and 1-carboxy-methyl-3-aminocyclopentane or its lactam.

The difficulty meltable polyurethanes contemplated are polymers having repeating structural units of the formulas —NR—Y—NR'—CO—O—Y'—CO—O— resulting, for example, from the condensation of a diisocyanate with a dihydric alcohol or phenol or the condensation of a diamine with a bis (chloroformate) of a dihydric alcohol or phenol, where the R's and Y's are as described above in connection with the polyamides, and the chemical structure of the polymer and/or the polymerization techniques used are such that a polymer melting above 179° C., is obtained. Particularly preferred are polyurethanes prepared from dihydric alcohols or phenols containing a meta- or para-phenylene or a 1,4-cyclohexylene radical. Some specific polyurethanes which may be used are the condensation product of piperazine with the bis (chloroformate) of bis (p-hydroxy-phenyl) propane-2,2, the condensation product of piperazine with the bis (chloroformate) of hydroquinone and the condensation product of tetramethylene diamine with the bis (chloroformate) of butane-diol-1,4 each of which has a melting point above 210° C.

Difficulty meltable polyureas which may be formed into useful shaped articles in accordance with this invention have repeating structural units of the formula —CO—NR—Y—NR—CO—NR'—Y'—NR'— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha/beta diurea with a diamine, the chemical structure of the polymer and/or the polymerization technique being such that a polymer melting above 179° C., preferably above 210° C. is obtained. Some specific polyureas contemplated are those obtained from the reaction of hexamethylene diisocyanate with hexamethylene diamine and from the reaction of m-phenylene diisocyanate with m-phenylene diamine each of which polyurea melts above 210° C.

The easily meltable polyamides contemplated under this invention include for example those polyamides having a melting point no higher than 270° C. These polyamides include for example those prepared from aliphatic saturated dicarboxylic acids, e.g., alkylene dicarboxylic acids containing 5 to 12 carbon atoms and aliphatic saturated diamines containing 2 to 12 carbon atoms and also polyamides prepared from aliphatic saturated aminocarboxylic acids and their lactams, e.g., omega-aminoalkanoic acids and their lactams containing, for example 6 to 10 carbon atoms. Some specific easily meltable polyamides which may be used are for example poly (polymethylene) adipamides wherein the polymethylene groups contain 2 to 12 carbon atoms such as polyhexamethylene adipamide, the poly (polymethylene) sebacamides wherein the polymethylene groups contain 2 to 12 carbon atoms such as polyhexamethylene sebacamide, and polycaprolactam. Preferably, the easily meltable polamide is itself a fiber-forming polymer solid at room temperature and is substantially compatible with the difficulty meltable polymer in the amount used so that filaments formed in accordance with this invention exhibit no evidence of phase separation.

Shaped articles such as filaments of particularly desirable mechanical properties are obtained when the difficulty meltable polymer is polyhexamethylene terephthalamide and the easily meltable polymer is polyhexamethylene adipamide.

The difficultly meltable polymer, e.g., polyhexamethylene terephthalamide is a high molecular weight fiber-forming polymer suitably, having an inherent viscosity of at least 0.6, preferably 0.9 to 1.5, while the easily meltable polyamide, e.g., polyhexamethylene adipamide is suitably also a high molecular weight fiber-forming polymer having an inherent viscosity of at least 0.1, preferably 0.5 to 1.2, the inherent viscosities being determined from a solution of 0.4 gram of polymer per deciliter of concentrated sulfuric acid at 25° C.

The solutions of this invention may be extruded, for example through the orifices of a spinnerette to form filaments which are particularly useful in the manufacture of textiles, or through a slot-shaped opening to form easily colored films useful, for example in packaging applications.

In accordance with another aspect of the invention, a shaped article, e.g., a filament containing the difficultly meltable and easily meltable polymers, is formed from a solution obtained by dissolving both polymers in concentrated sulfuric acid. The acid may have a concentration of for example 75 to 100% by weight of $H_2SO_4$. Fuming sulfuric acid, e.g., containing up to 6 or 7% by weight or even higher of free sulfur trioxide may also be used.

The solution to be extruded may contain for example 6 to 19.4% by weight of the difficultly meltable polymer and 0.024 to 5% by weight of the easily meltable polymer. The easily meltable polymer may be present, for example, in the range of 3 to 25% preferably about 5 to 10% based on the weight of the total polymer. The extruded solution may be at a temperature for example, in the range of 20 to 100° C.

A particularly suitable liquid coagulant for the polymer solution in concentrated sulfuric acid is an aqueous solution of sulfuric acid having a concentration considerably lower than that of the acid in which the polymer is dissolved and low enough such that the polymer mixture is coagulated into a shaped article. When using aqueous sulfuric acid as the liquid coagulant, the concentration of sulfuric acid in said liquid coagulant, i.e., the spin bath may be varied considerably depending on various modifications of the process. However, such concentration, especially when spinning polyterephthalamides such as polyhexamethylene terephthalamide as the difficultly meltable polymer will in many cases be below 60% by weight, and, in some cases may be as low as 40%. Moreover, concentrations lower than 40% may be used in some cases. The temperature of the spin bath into which the spinning solution is extruded may be, for example, in the range of 20 to 100° C., preferably 40 to 60° C. Filaments, e.g., containing a polyterephthalamide such as polyhexamethylene terephthalamide as the difficulty meltable polymer, of particularly desirable properties are obtained using a substantially unmodified spinning system of the foregoing type if the aqueous sulfuric acid of the spin bath has a temperature and concentration within the area defined by curves A and B of FIGURE 1 of application Serial No. 83,981. However, it is possible in some cases to alter somewhat the shapes and locations of these curves and the other curves of the figure by using various process modifications.

The polymer solutions in concentrated sulfuric acid also may be wet spun into coagulating or spin baths other than aqueous sulfuric acid. For example, at temperatures around 20° C. the sulfuric acid solutions of this invention, e.g., of polyhexamethylene terephthalamide may be extruded into aqueous formic acid of 52 to 68% by weight formic acid concentration or into aqueous acetic acid of 52 to 63% by weight concentration. The solutions may also be extruded into spin baths of aqueous formic or acetic acid of considerably higher temperature, e.g., 25 to 55° C. in which case lower acid concentrations may be used.

While shaped articles such as filaments of particularly desirable properties may be made by wet extruding a solution of the polymers in concentrated sulfuric acid, shaped articles may also be formed using a solution of the polymers in other solvents, e.g., a solvent comprising boron trifluoride as disclosed in Serial No. 107,295, filed May 3, 1961, phosphoric acid of over 85% concentration as disclosed in Serial No. 44,545, filed July 22, 1960, a solvent comprising antimony trichloride as disclosed in Serial No. 42,465 and Serial No. 42,579 each filed July 13, 1960, and a solvent comprising formic acid and a minor amount of hydrochloric or sulfuric acid as disclosed in Serial No. 34,364, filed June 7, 1960. The entire disclosure of each of these applications, which are assigned to the same assignee as this application, is incorporated herein by reference. In addition, the shaped articles of this invention may be formed by dry extrusion techniques, e.g., by extruding a solution of the polymers in trifluoroacetic acid into an evaporative atmosphere.

The solution of the polymers, particularly in concentrated sulfuric acid as solvent, may be spun at a spinning speed, e.g., at the first take up roll of, for example, 30 to 150 meters per minute to obtain filaments having a denier for example in the range of 0.1 to 50.

Shaped articles such as filaments formed in accordance with this invention have improved affinity for disperse or acid dyes, preferably of the azo or anthraquinone types. The disperse dyes which are applied to such shaped articles are generally those which are utilized in the form of a dispersion in an aqueous bath. Some specific disperse dyes which may be used are, for example, Eastone Red N–GLF (Disperse Red 35), Celliton Yellow G (Disperse Yellow 1), Celliton Scarlet BA (Disperse Red 1) and Interchemical Acetate Blue B (Disperse Blue 3). This type of dyestuff is usually sold as a mixture of the actual dye compound with a dispersing agent and as sodium N-methyl-N-oleyl-tauride, sodium lignosulfonate, or the sodium salt of formaldehyde-naphthalene condensation product. The mixture may contain, for example, about 30 to 45% by weight of the actual dye compound.

Some acid dyes which may be used are, for example, Alizarine Sky Blue BS–CF (Acid Blue 78), Alizarine Light Blue SE (Acid Blue 43), Xylene Light Yellow 2G (Acid Yellow 17) and Xylene Milling Red G (Acid Red 97).

The designations of the above dyes in parentheses refer to those of Part I of the new edition of the Colour Index.

Filamentary material produced in accordance with the invention may be dyed for example, in the form of staple or in the form of substantially continuous filaments and includes tows, yarns, rovings, slivers, nonwoven battings and fabrics.

The following examples further illustrate the invention.

Example I

Solid polyhexamethylene terephthalamide of 1.22 inherent viscosity and having a melting point of 380° C., and polyhexamethylene adipamide of 0.9 inherent viscosity and having a melting point of 264° C., were mixed to yield a mixture containing 5% by weight of the polyhexamethylene adipamide based on the weight of total polymer. The inherent viscosity of each polymer was determined from a solution containing 0.4 gram of polymer per deciliter of concentrated sulfuric acid of 97.5% by weight concentration. The mixture was dried in a vacuum oven at 50° C. and ground in a ball mill to pass through a 40–80 mesh screen. The mixture was then added to concentrated sulfuric acid of 97.5% concentration to yield a composition containing 14% by weight of total polymer and the composition was stirred until the polymer was completely dissolved by visual inspection. After filtering and deaeration by centrifugation the dope had a Synchro-Lectric viscosity at 25° C. of 1760 poises.

The solution was extruded in a horizontal direction through a jet 100 microns in diameter into a spin bath of aqueous sulfuric acid of 49.7% by weight concentration and having a temperature of 47.5° C. The spin bath was contained in an open trough, 1 meter long and the spin bath was circulated cocurrent with the direction of extrusion at a velocity between about 0.1 and 2 meters per minute. The filament was snubbed in an upward direction around a guide located in the spin bath near its exit end such that the filament defined an angle of 135° C. around the guide and was pulled around another guide located outside the exit end of the spin bath so as to resume its horizontal direction. It was then wound up on perforated bobbins at the end of the trough away from the spinning jet at a spinning speed of 50 meters per minute. The bobbins were immersed in running water until the yarn was acid free and the yarn was dried at room temperature while still wound on the bobbin. The filament had a denier of about 3, a tenacity of 2.7 grams per denier, an elongation of 63.0 and a tensile factor (product of the tenacity in grams per denier and square root of percent elongation) of 21.4.

100 mg. of the fiber in ¼ inch lengths were added to 600 mls. of distilled water containing 300 mg. of the acid dye Alizarine Sky Blue BS–CF (No. 1088 in old Colour Index or Acid Blue 78 in Part I of new Colour Index), 0.5 gram per liter of "Igepon T–77" (an anionic surface-active agent containing sodium N-methyl-N-oleyl-tauride) and 0.5 gram per liter of "Calgon" water softener (sodium hexametaphosphate). The fiber was dyed for two hours at 97° C. under mechanical stirring. After washing, drying and extracting with tetrachloroethylene, the fibers were dissolved in dichloroacetic acid and the percentage of dyestuff was determined colorimetrically by means of a Lumitron colorimeter. The fiber was found to contain 0.84% of dye based on the weight of the fiber.

Example II

The procedure of Example I was repeated except that the spinning solution contained 15% by weight of total polymer and had a Synchro-Lectric viscosity at 25° C. of 2560 poises and the polyhexamethylene adipamide was present in an amount of 10% by weight of the total polymer. The resulting filament had a denier of 3.0, a tenacity of 2.3 grams per denier, an elongation of 45.0% and a tensile factor of 15.5. On dyeing with Alizarine Sky Blue BS–CF as described in Example I, the fiber was found to contain 1.36% by weight of dye.

The dyeing procedure of Example I was repeated except that the dye was a disperse dye, Eastone Red N–GLF (Disperse Red 35 in Part I of new Colour Index). The fiber was found to contain 2.7% by weight of dye.

As a control, the procedure of Example I was repeated except that the spinning solution contained 15% of the polyhexamethylene terephthalamide as the sole polymer and had a Synchro-Lectric viscosity at 25° C. of 2200 poises. The resulting filament had a denier of 3.0, a tenacity of 3.2 grams per denier, an elongation of 44.0 percent and a tensile factor of 21.4. When dyed with Alizarine Sky Blue BS–CF as described in Example I, the fiber was found to contain 0.52% of dye. When dyed with Eastone Red N–GLF using the procedure of Example I, the fiber was found to contain 1.2% of dye.

The tenacities and elongations given in the examples were measured with an Instron Tensile Tester at a 3⅓ inch gauge length and a 60% per minute strain rate (rate of fiber extension), in air at 23° C. and 65% relative humidity.

It is to be understood that the foregoing detailed description is given merely by way of illustration and that many variations may be made therein without departing from the spirit of my invention.

Having described my invention what I desire to secure by Letters Patent is:

1. A process comprising extruding through an opening having at least one thin dimension a solution in a solvent therefor of a difficultly meltable polyterephthalamide and an easily meltable polyamide selected from the group consisting of a polyamide of an alkylene dicarboxylic acid containing 5 to 12 carbon atoms and an aliphatic saturated diamine containing 2 to 12 carbon atoms, a polyamide of an omega-aminoalkanoic acid containing 6 to 10 carbon atoms, and a polyamide of a lactam of an omega-aminoalkanoic acid containing 6 to 10 carbon atoms, to form a shaped article containing said polymers.

2. The process of claim 1 wherein said opening is the orifice of a spinnerette such that said shaped article is a filament.

3. The process of claim 1 wherein said easily meltable polyamide is present in an amount of 3 to 25% by weight of the total polymer.

4. The process of claim 1 wherein said difficulty meltable polyterephthalamide has a melting point above 275° C. and said easily meltable polyamide has a melting point no higher than 270° C.

5. The process of claim 4 wherein said difficulty meltable polyterephthalamide is polyhexamethylene terephthalamide and said easily meltable polyamide is polyhexamethylene adipamide.

6. A process comprising dissolving in concentrated sulfuric acid a polymer mixture containing a major amount of a difficultly meltable polyterephthalamide and a minor amount of an easily meltable polyamide selected from the group consisting of a polyamide of an alkylene dicarboxylic acid containing 5 to 12 carbon atoms and an aliphatic saturated diamine containing 2 to 12 carbon atoms, a polyamide of an omega-aminoalkanoic acid containing 6 to 10 carbon atoms, and a polyamide of a lactam of an omega-aminoalkanoic acid containing 6 to 10 carbon atoms, and extruding the solution through an opening into a liquid coagulant for the polymer to form a filament.

7. The process of claim 6 wherein said liquid coagulant is aqueous sulfuric acid.

8. The process of claim 7 wherein said difficultly meltable polyterephthalamide has a melting point of at least 275° C. and said easily meltable polyamide has a melting point no higher than about 270° C.

9. The process of claim 8 wherein said difficultly meltable polyterephthalamide is polyhexamethylene terephthalamide and said easily meltable polyamide is polyhexamethylene adipamide.

10. A composition comprising a polymer mixture containing a difficultly meltable polyterephthalamide and an easily meltable polyamide selected from the group consisting of a polyamide of an alkylene dicarboxylic acid containing 5 to 12 carbon atoms and an aliphatic saturated diamine containing 2 to 12 carbon atoms, a polyamide of an omega-aminoalkanoic acid containing 6 to 10 carbon atoms, and a polyamide of a lactam of an omega-aminoalkanoic acid containing 6 to 10 carbon atoms.

11. A filament comprising a blend of a major amount of a difficultly meltable polyterephthalamide having a melting point of at least 275° C. and a minor amount of an easily meltable polyamide having a melting point no higher than 270° C.

12. A filament comprising a blend of a major amount of polyhexamethylene terephthalamide and a minor amount of polyhexamethylene adipamide.

13. A shaped article of the composition of claim 10 dyed with a member of the group consisting of acid dyes and disperse dyes.

14. The filament of claim 11 dyed with a member of the group consisting of acid dyes and disperse dyes.

15. The filament of claim 12 dyed with a member of the group consisting of acid dyes and disperse dyes.

16. The process of claim 1 wherein said difficultly meltable condensation polymer is a polyterephthalamide and said easily meltable polymer is present in said solution in an amount no greater than about 10% based on the weight of the total polymer.

17. The process of claim 6 wherein said difficultly meltable condensation polymer is a polyterephthalamide and said easily meltable polymer is present in said solution in an amount no greater than about 10% based on the weight of the total polymer.

References Cited by the Examiner
UNITED STATES PATENTS

| | | | |
|---|---|---|---|
| 2,130,948 | 9/38 | Carothers | 18—54 |
| 2,193,529 | 3/40 | Coffman | 260—42 |
| 2,489,569 | 11/49 | Foulds et al. | |
| 2,811,410 | 10/57 | Munch et al. | 18—54 |
| 2,831,834 | 4/58 | Magat | 260—78 |
| 2,874,139 | 2/59 | Symons | 260—37 |
| 2,901,466 | 8/59 | Kibler et al. | 260—857 XR |
| 2,918,347 | 12/59 | Notarbartolo et al. | 18—54 |
| 2,944,993 | 7/60 | Brebner | 260—37 |
| 3,040,003 | 6/62 | Beaman | 260—32.6 XR |
| 3,154,512 | 10/64 | Parczewski | 260—31.2 |

MORRIS LIEBMAN, *Primary Examiner.*

WILLIAM J. STEPHENSON, *Examiner.*